(12) United States Patent
Fay, II (10) Patent No.: US 10,681,871 B1
(45) Date of Patent: Jun. 16, 2020

(54) LOADING ASSEMBLY OF A BALE WAGON (71) Applicant: CNH Industrial America LLC, New Holland, PA (US)

(72) Inventor: Jeffrey Brown Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/369,128

(22) Filed: Mar. 29, 2019

(51) Int. Cl.
*A01D 90/02* (2006.01)

(52) U.S. Cl.
CPC .................................... *A01D 90/02* (2013.01)

(58) Field of Classification Search
CPC .................. A01D 90/08; A01D 85/005; A01D 2085/007; A01F 15/0883; A01F 2015/0808
USPC ........................ 414/24.5, 24.6, 111, 132, 334
See application file for complete search history.

(56) References Cited

U.S. PATENT DOCUMENTS

| | | | |
|---|---|---|---|
| 4,961,679 A * | 10/1990 | Van Eecke | A01D 85/005 414/111 |
| 5,607,274 A * | 3/1997 | Cook | A01D 90/08 414/111 |
| 5,846,046 A | 12/1998 | Warburton | |
| 6,126,374 A | 10/2000 | Carls | |
| 6,514,029 B2 | 2/2003 | Millsap | |
| 7,399,153 B2 | 7/2008 | Koehn et al. | |
| 8,112,202 B2 | 2/2012 | Fackler et al. | |
| 8,585,342 B2 * | 11/2013 | Smith | A01D 90/08 414/111 |
| 10,091,937 B2 * | 10/2018 | Fay, II | A01D 85/00 |
| 10,136,581 B2 * | 11/2018 | Millsap | A01D 85/005 |
| 10,231,382 B2 * | 3/2019 | Totten | A01D 90/08 |
| 2015/0272007 A1 * | 10/2015 | Smith | A01D 90/10 414/24.5 |

* cited by examiner

*Primary Examiner* — Lynn E Schwenning
(74) *Attorney, Agent, or Firm* — Peter Zacharias; Patrick Sheldrake (57) ABSTRACT

A loading assembly of a bale wagon includes a lift actuator configured to drive a clamp assembly to rotate about a local lateral axis and a rotation actuator configured to drive the clamp assembly to rotate about a vertical axis. The loading assembly also includes a controller communicatively coupled to the lift actuator and to the rotation actuator, in which the controller includes a memory and a processor. The controller is configured to selectively control the lift actuator to rotate the clamp assembly about the local lateral axis between a collection position and a longitudinal delivery position, and control the lift actuator and the rotation actuator to rotate the clamp assembly about the local lateral axis and about the vertical axis between the collection position and a lateral delivery position.

18 Claims, 7 Drawing Sheets

LOADING ASSEMBLY OF A BALE WAGON

BACKGROUND

The present disclosure relates generally to a loading assembly of a bale wagon.

Bale wagons are used after a crop harvesting process to collect bales of crop material. For example, a bale wagon may be used to collect bales of hay or other crop material that is located on a surface of a field. The bale wagon may then form the bales into a composite stack on the bale wagon, and subsequently discharge the composite stack into a storage area. The bale wagon may include tables that receive bales collected from the field, form the composite stack, and facilitate discharge of the composite stack into the storage area. For example, the bale wagon may include a first table that receives the bale from a bale loading assembly mounted on a chassis of the bale wagon. The first table accumulates a selected number of bales, which are arranged in a row. Once a desired number of bales are accumulated in a row, the first table transfers the row of bales to a second table that accumulates several rows of bales. The second table transfers the rows of bale to a third table, or load bed, which forms the composite stack and unloads the composite stack into the storage area. For example, the third table may pivot (e.g., about 90 degrees) and deposit the composite stack on a surface of the storage area (e.g., the surface of the field, the floor of a storage building, etc.).

Certain loading assemblies include a clamp assembly configured to capture a bale on the surface of the field. For example, the clamp assembly may capture a bale having a longitudinal axis that is substantially parallel to the direction of travel of the bale wagon. The loading assembly may then rotate the clamp assembly about a rotation axis that is angled relative to the direction of travel of the bale wagon. Upon completion of the rotation, the longitudinal axis of the bale may be substantially perpendicular to the direction of travel of the bale wagon, and the bale may be disposed on the first table of the bale wagon. The clamp assembly may then release the bale, thereby delivering the bale to the first table. Unfortunately, rotating the clamp assembly and the bale about the angled rotation axis substantially shifts the center of gravity of the bale wagon during the rotation. As a result, the contact force between at least one wheel of the bale wagon and the surface of the field may be substantially reduced, thereby reducing the traction of the bale wagon.

BRIEF DESCRIPTION

In certain embodiments, a loading assembly of a bale wagon includes a lift actuator configured to drive a clamp assembly to rotate about a local lateral axis and a rotation actuator configured to drive the clamp assembly to rotate about a vertical axis. The loading assembly also includes a controller communicatively coupled to the lift actuator and to the rotation actuator, in which the controller includes a memory and a processor. The controller is configured to selectively control the lift actuator to rotate the clamp assembly about the local lateral axis between a collection position and a longitudinal delivery position, and control the lift actuator and the rotation actuator to rotate the clamp assembly about the local lateral axis and about the vertical axis between the collection position and a lateral delivery position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
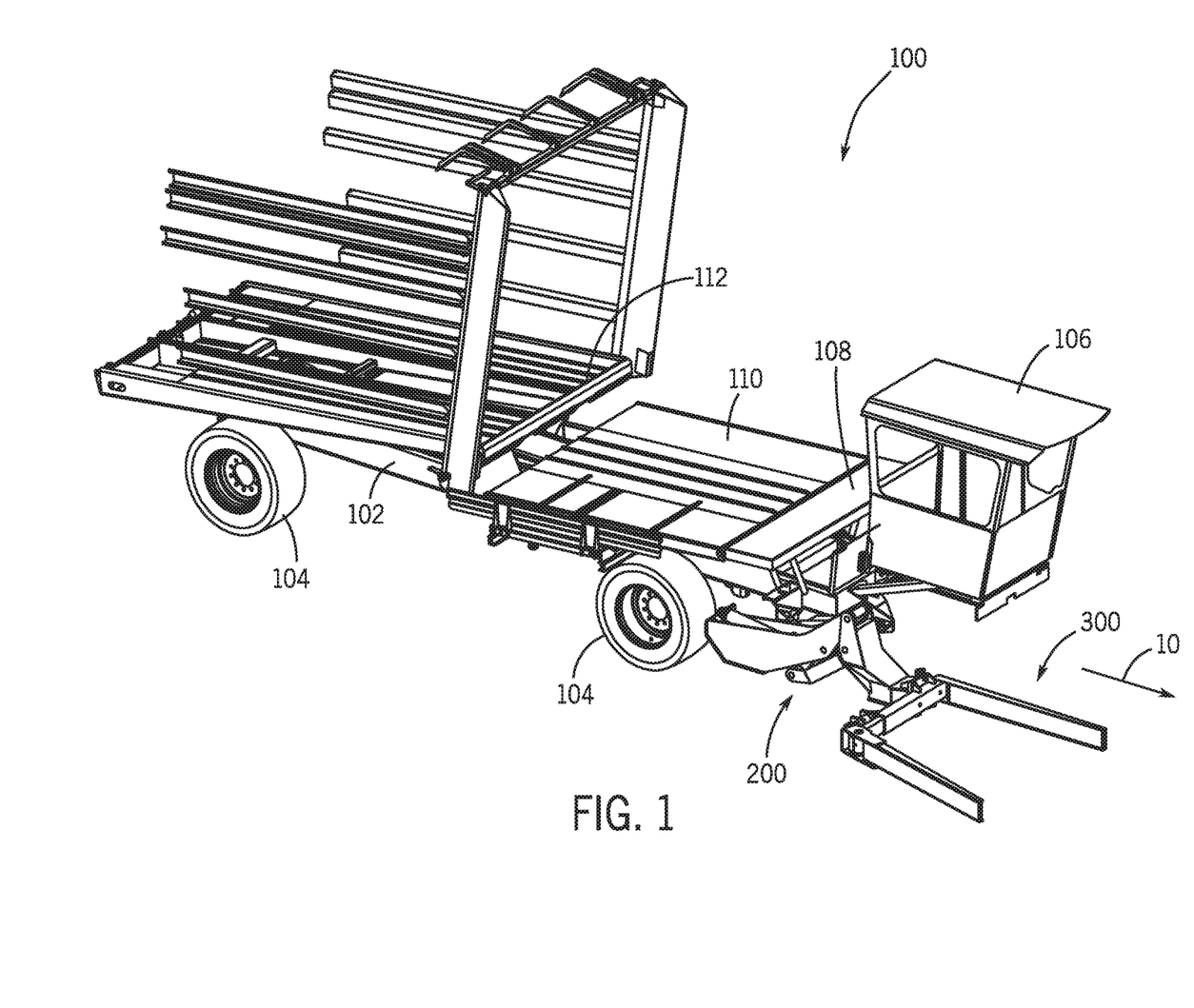
FIG. 1 is a perspective view of an embodiment of a bale wagon having a loading assembly, in which a clamp assembly of the loading assembly is in a collection position.

Turning to the drawings, FIG. 1 is a perspective view of an embodiment of a bale wagon 100 having a loading assembly 200, in which a clamp assembly 300 of the loading assembly 200 is in a collection position. In the illustrated embodiment, the bale wagon 100 includes a chassis 102 and wheels 104 rotatably coupled to the chassis 102. One or more wheels 104 may be driven to rotate by a drive system (e.g., including an engine, a transmission, a drive shaft, differential(s), etc.) coupled to the chassis 102, thereby moving the bale wagon 100 along a direction of travel 10 (e.g., through a field). Furthermore, in the illustrated embodiment, the bale wagon 100 includes a cab 106 coupled to the chassis 102. The cab 106 is configured to house an operator and may include controls (e.g., a steering wheel, pedal(s), hand controller(s), etc.) configured to enable the operator to control the direction of travel of the bale wagon 100 and/or operation of various systems of the bale wagon, such as the loading assembly 200. While the bale wagon 100 is a self-propelled vehicle in the illustrated embodiment, in other embodiments, the bale wagon may be towed by a work vehicle (e.g., tractor, etc.). In such embodiments, the drive system and/or the cab may be omitted.

In the illustrated embodiment, the bale wagon includes a first table 108, a second table 110, and a third table 112. The loading assembly 200 is configured to move a bale from a surface of the field to the first table 108. For example, the bale wagon 100 may be oriented such that the direction of travel 10 is substantially parallel to a longitudinal axis of a bale on the surface of the field. Accordingly, with the clamp assembly 300 in the illustrated collection position, the bale wagon 100 may be positioned to align the clamp assembly 300 with the bale (e.g., such that arms of the clamp assembly are positioned on opposite lateral sides of the bale). As the bale wagon 100 moves along the direction of travel 10, the bale engages the clamp assembly 300 (e.g., the bale contacts a rearward portion of the clamp assembly). The clamp assembly 300 may then capture the bale. For example, a clamp actuator may drive first and second arms of the clamp assembly toward one another to capture the bale within the clamp assembly 300. Once the bale is captured by the clamp assembly 300, actuators of the loading assembly 200 may move (e.g., rotate) the clamp assembly 300 to position the bale on the first table 108. The clamp assembly may then release the bale, thereby delivering the bale to the first table 108.

The first table 108 may accumulate a selected number of bales (e.g., which are arrange in a row). Once a desired number of bales are accumulated on the first table 108, the first table 108 may transfer the bales (e.g., the row of bales) to the second table 110. For example, the second table 110 (e.g., and the first table) may be titled such that a forward longitudinal end of the table(s) is higher than a rearward longitudinal end of the table(s). Gravity may then drive the bales rearwardly (e.g., to the back of the second table 110). The second table 110 may accumulate several groups (e.g., rows) of bales, thereby forming a portion of a bale stack. The second table 110 may then transfer the portion of the bale stack to the third table 112, or load bed (e.g., via rotation of the second table 110 about 90 degrees upwardly about a fixed lateral axis of the bale wagon 100). The third table 112 may accumulate several bale stack portions from the second table 110, thereby forming a composite bale stack. The third table 112 may also unload the composite bale stack into a desired storage area. For example, once the composite bale stack is formed, the third table may pivot (e.g., about 90 degrees) to deliver the composite bale stack on a surface of the storage area (e.g., the surface of the field, the floor of a storage building, etc.).

In certain embodiments, the loading assembly 200 is configured to selectively deliver the bales to the first table 108/second table 110 in a first orientation, in which the longitudinal axis of the bale is substantially parallel to a longitudinal axis of the bale wagon (e.g., corresponding to the direction of travel 10 of the bale wagon), and in a second orientation, in which the longitudinal axis of the bale is substantially parallel to a fixed lateral axis of the bale wagon. For example, the loading assembly 200 may include a lift actuator configured to drive the clamp assembly 300 to rotate about a local lateral axis. The loading assembly 200 may also include a rotation actuator configured to drive the clamp assembly 300 to rotate about a vertical axis. In addition, the loading assembly 200 may include a controller communicatively coupled to the lift actuator and to the rotation actuator. The controller may be configured to selectively control the lift actuator to rotate the clamp assembly about the local lateral axis between the illustrated collection position and a longitudinal delivery position, and control the lift actuator and the rotation actuator to rotate the clamp assembly about the local lateral axis and about the vertical axis between the illustrated collection position and a lateral delivery position. While the clamp assembly 300 is in the longitudinal delivery position, the bale is positioned on the first table 108/second table 110 at the first orientation, and while the clamp assembly 300 is in the lateral delivery position, the bale is positioned on the first table 108/second table 110 in the second orientation.

Because the loading assembly is configured to deliver each bale to the first table 108/second table 110 in both the first orientation and the second orientation, the composite bale stack may be formed by bales in the first orientation, by bales in the second orientation, or by bales in a combination of the first and second orientations. For example, a first portion of the bale stack (e.g., the portion of the bale stack formed on the second table 110) may be formed by bales arranged in the first orientation, and a second portion of the bale stack (e.g., the portion of the bale stack formed on the second table 110) may be formed by bales arranged in the second orientation. The alternating pattern of bale orientations may be repeated as the composite bale stack is formed on the third table 112. Forming a composite bale stack having such an alternating pattern of bale orientations may establish a more stable composite bale stack than a composite bale stack formed by bales having the same orientation. While a composite bale stack having an alternating pattern of bale orientations is described above, the loading assembly may also be controlled to form a composite bale stack of bales arranged in the same orientation or a composite bale stack having any suitable pattern of bale orientations. Accordingly, the loading assembly provides the flexibility to establish a variety of composite bale stacks.

Additionally or alternatively, the controller may be configured to control the lift actuator and the rotation actuator to reduce a center of gravity (CG) shift during the movement of the clamp assembly/bale from the collection position to the lateral delivery position. For example, in certain embodiments, the controller may be configured to control the lift actuator and the rotation actuator to rotate the clamp assembly between the collection position and the lateral delivery position via a two-part process. The two-part process includes controlling the lift actuator to rotate the clamp assembly about 180 degrees about the local lateral axis, and controlling the rotation actuator to rotate the clamp assembly about 90 degrees about the vertical axis in response to receiving a signal indicative of a CG of the bale being substantially positioned along the vertical axis. In certain embodiments, the controller may be configured to control the lift actuator to terminate rotation of the clamp assembly about the local lateral axis in response to receiving the signal indicative of the CG of the bale being substantially positioned along the vertical axis, and the controller may be configured to control the lift actuator to resume rotation of the clamp assembly about the local lateral axis in response to the clamp assembly being rotated about 90 degrees about the vertical axis. However, in other embodiments, the controller may be configured to control the lift actuator to rotate the clamp assembly continuously about the local lateral axis (e.g., before the rotation about the vertical axis, during the rotation about the vertical axis, and after the rotation about the vertical axis, if the rotation about the local lateral axis is not complete). Furthermore, in certain embodiments, the controller may be configured to control the lift actuator to reduce the rotation rate of the clamp assembly about the local lateral axis in response to receiving the signal indicative of the CG of the bale being substantially positioned along the vertical axis.

Because the clamp assembly is not rotated about the vertical axis until the CG of the bale is substantially positioned along the vertical axis, the CG of the bale wagon may be substantially maintained in a desired location as the loading assembly moves the clamp assembly from the collection position to the lateral delivery position (e.g., as compared to a loading assembly that rotates the clamp assembly about a single axis that is angled relative to the longitudinal axis of the bale wagon and causes the CG of the bale wagon to shift during rotation of the clamp assembly about the single axis between the collection position and the lateral delivery position). Accordingly, traction between the wheels of the bale wagon and the ground may be substantially maintained. While the two-part process for rotating the clamp assembly between the collection position and the lateral delivery position is described above with reference to the illustrated loading assembly, in certain embodiments, the two-part process may be utilized with any other suitable loading assembly configuration (e.g., a loading assembly that is only configured to move the clamp assembly between the collection position and the lateral delivery position). Furthermore, while the bale wagon includes three tables in the illustrated embodiment, in other embodiments, the bale wagon may have more or fewer tables in any suitable configuration. In such embodiments, the loading assembly may be configured to deliver the bale to a table suitable for the configuration.

Figure 2:
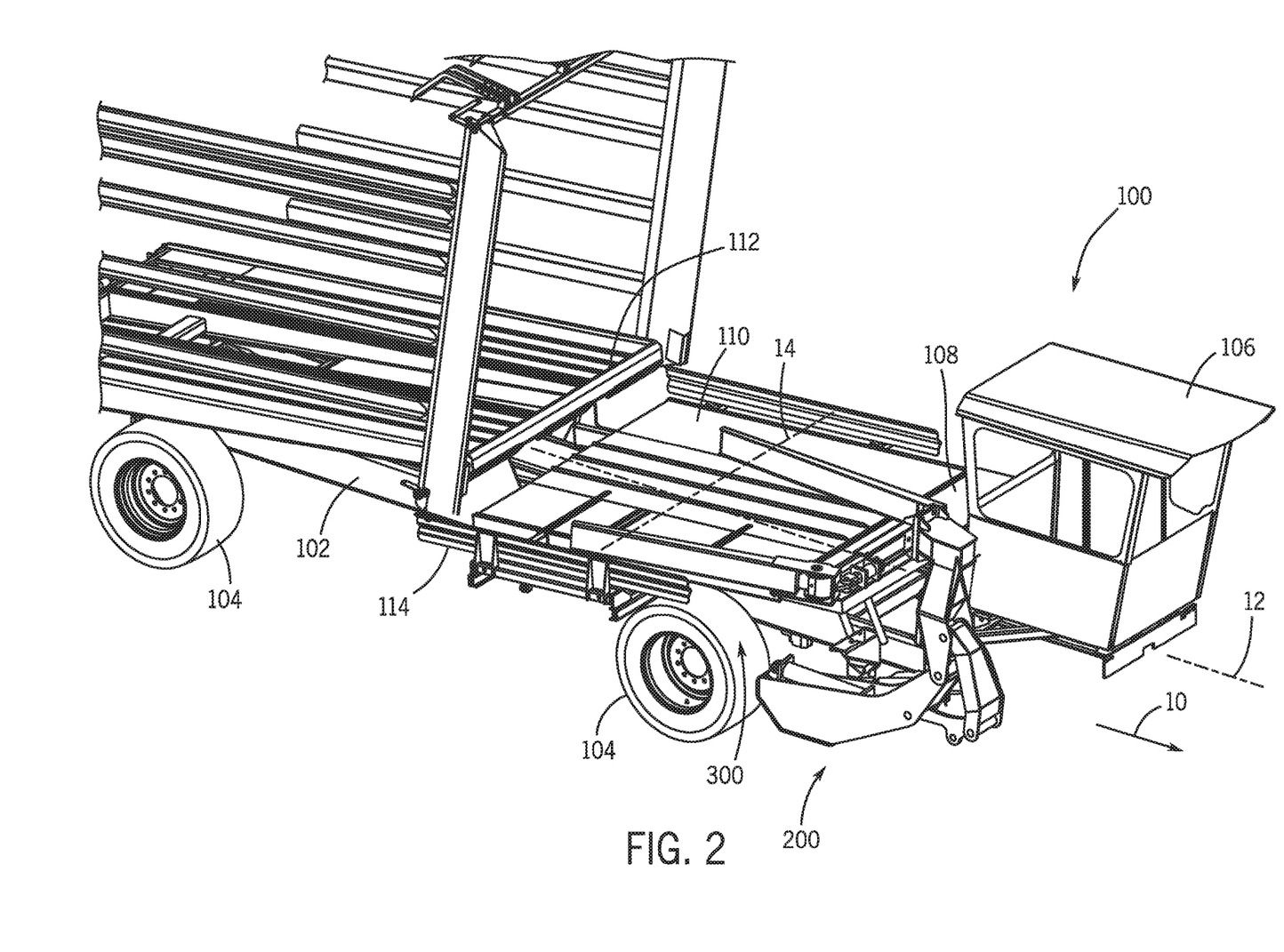
FIG. 2 is a perspective view of the bale wagon of FIG. 1, in which the clamp assembly of the loading assembly is in a longitudinal delivery position.

FIG. 2 is a perspective view of the bale wagon 100 of FIG. 1, in which the clamp assembly 300 of the loading assembly 200 is in a longitudinal delivery position. To transition the clamp assembly 300 from the collection position shown in FIG. 1 to the illustrated longitudinal delivery position, the controller may instruct the lift actuator to rotate the clamp assembly 300 about the local lateral axis. For example, the controller may control the lift actuator to rotate the clamp assembly 300 about 180 degrees about the local lateral axis between the collection position and the illustrated longitudinal delivery position. However, in other embodiments, the lift actuator may rotate the clamp assembly through a larger or smaller angle between the collection position and the longitudinal delivery position (e.g., based on the configuration of the first loading table). For example, the angle may be between about 150 degrees and about 210 degrees, between about 160 degrees and about 200 degrees, or between about 170 degrees and about 190 degrees. As previously discussed, the clamp assembly 300 is configured to position the bale on the table (e.g., the first table 108) of the bale wagon 100, such that the longitudinal axis of the bale is substantially parallel to the longitudinal axis 12 of the bale wagon 100, while the clamp assembly 300 is in the longitudinal delivery position.

After the bale is placed in contact with the first table 108/second table 110, the clamp assembly 300 releases the bale, thereby delivering the bale to the first table 108/second table 110. The lift actuator of the loading assembly 200 then returns the clamp assembly 300 to the collection position. For example, the controller may control the lift actuator to rotate the clamp assembly 300 about 180 degrees about the local lateral axis between the illustrated longitudinal delivery position and the collection position. Because the longitudinal axis of the bale is substantially parallel to the longitudinal axis 12 of the bale wagon 100, the bale may extend along a substantial portion of the longitudinal extent of the first table 108 and the second table 110 (e.g., extent of the first and second tables along the longitudinal axis 12 of the bale wagon 100). After a first bale is delivered to the first and second tables, a lateral shifting mechanism 114 of the bale wagon 100 may drive the first bale along the fixed lateral axis 14 (e.g., toward the cab 106), thereby establishing a space on the first and second tables suitable for receiving a second bale. The loading assembly 200 may then deliver a second bale to the first and second tables, and the process may repeat until a portion of the bale stack is formed on the first and second tables (e.g., including three bales each having a longitudinal axis substantially parallel to the longitudinal axis of the bale wagon). The second table 110 may then transfer the portion of the bale stack to the third table 112 (e.g., via rotation of the second table 110 about 90 degrees upwardly about an axis parallel to the fixed lateral axis 14 of the bale wagon 100). The third table 112 may accumulate several bale stack portions from the second table 110, thereby forming a composite bale stack.

Figure 3:
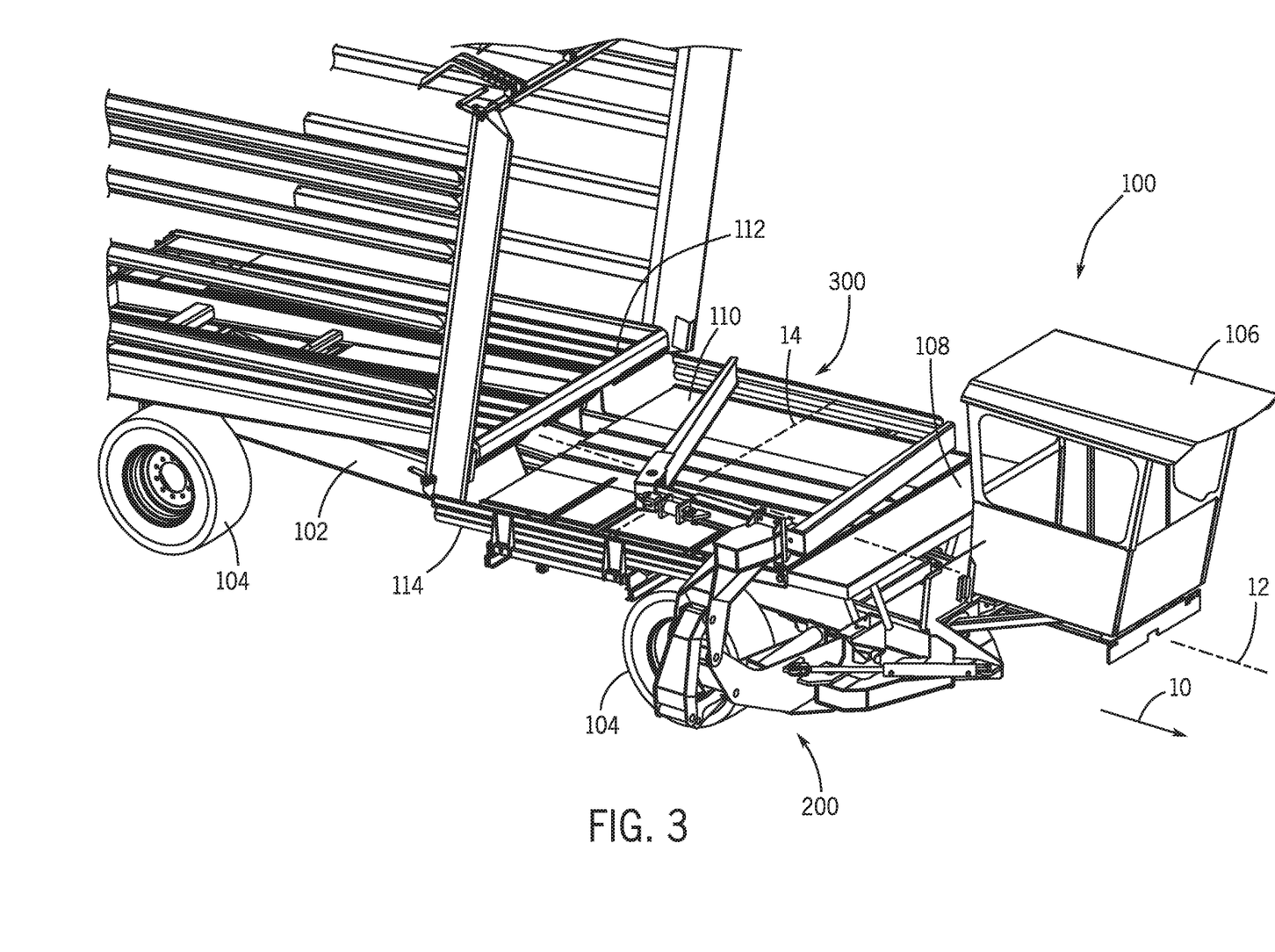
FIG. 3 is a perspective view of the bale wagon of FIG. 1, in which the clamp assembly of the loading assembly is in a lateral delivery position.

FIG. 3 is a perspective view of the bale wagon of FIG. 1, in which the clamp assembly 300 of the loading assembly 200 is in a lateral delivery position. To transition the clamp assembly 300 from the collection position shown in FIG. 1 to the illustrated lateral delivery position, the controller may instruct the lift actuator and the rotation actuator to rotate the clamp assembly 300 about the local lateral axis and about the vertical axis. For example, the controller may control the lift actuator to rotate the clamp assembly 300 about 180 degrees about the local lateral axis, and the controller may control the rotation actuator to rotate the clamp assembly 300 about 90 degrees about the vertical axis between the collection position and the illustrated lateral delivery position. However, in other embodiments, the lift actuator may rotate the clamp assembly through a larger or smaller angle between the collection position and the lateral delivery position (e.g., based on the configuration of the first loading table). For example, the angle may be between about 150 degrees and about 210 degrees, between about 160 degrees and about 200 degrees, or between about 170 degrees and about 190 degrees. In addition, in certain embodiments, the rotation actuator may rotate the clamp assembly through a larger or smaller angle between the collection position and the lateral delivery position (e.g., based on the desired angle of the longitudinal axis of the bale relative to the fixed lateral axis 14 of the bale wagon 100). For example, the angle may be between about 60 degrees and about 120 degrees, between about 70 degrees and about 110 degrees, or between about 80 degrees and about 100 degrees. In certain embodiments, the clamp assembly 300 is configured to position the bale on the table (e.g., the first table 108) of the bale wagon 100, such that the longitudinal axis of the bale is substantially parallel to the fixed lateral axis 14 of the bale wagon 100, while the clamp assembly 300 is in the lateral delivery position.

After the bale is placed in contact with the first table 108/second table 110, the clamp assembly 300 releases the bale, thereby delivering the bale to the first table 108/second table 110. The lift actuator and the rotation actuator of the loading assembly 200 then return the clamp assembly 300 to the collection position. For example, the controller may control the lift actuator to rotate the clamp assembly 300 about 180 degrees about the local lateral axis, and the controller may control the rotation actuator to rotate the clamp assembly 300 about 90 degrees about the vertical axis between the illustrated lateral delivery position and the collection position. Because the longitudinal axis of the bale is substantially parallel to the fixed lateral axis 14 of the bale wagon 100, the bale may extend along a substantial longitudinal extent of the first table 108 (e.g., extent of the first table 108 along the longitudinal axis 12 of the bale wagon 100) and along a portion of the longitudinal extent of the second table 110 (e.g., extent of the second table 110 along the longitudinal axis 12 of the bale wagon 100). In addition, the bale may extend along a substantial portion of the lateral extent of the first and second tables (e.g., the extent of the first and second tables along the fixed lateral axis 14 of the bale wagon 100). After a first bale is delivered to the first and second tables, the second table 110 (e.g., and the first table 108) may be tilted such that a forward longitudinal end of the table(s) is higher than a rearward longitudinal end of the table(s). Gravity may then drive the bale rearwardly along the longitudinal axis 12 to establish a space on the first and second tables suitable for receiving a second bale. The loading assembly 200 may then deliver a second bale to the first and second tables, and the process may repeat until a portion of the bale stack is formed on the first and second tables (e.g., including three bales each having a longitudinal axis substantially parallel to the fixed lateral axis of the bale wagon). The second table 110 may then transfer the portion of the bale stack to the third table 112 (e.g., via rotation of the second table 110 about 90 degrees upwardly about an axis parallel to the fixed lateral axis 14 of the bale wagon 100). The third table 112 may accumulate several bale stack portions from the second table 110, thereby forming a composite bale stack.

In certain embodiments, the loading assembly 200 may be controlled to establish a first portion of the bale stack by arranging bales on the first table 108/second table 110 having longitudinal axes that are substantially parallel to the longitudinal axis 12 of the bale wagon 100, and the loading assembly 200 may be controlled to establish a second portion of the bale state by arranging bales on the first table 108/second table 110 having longitudinal axes that are substantially parallel to the fixed lateral axis 14 of the bale wagon 100. The loading assembly 200 may be controlled to establish alternating first and second portions as the composite bale stack is formed on the third table 112. Forming a composite bale stack having such an alternating pattern of bale orientations may establish a more stable composite bale stack than a composite bale stack formed by bales having the same orientation. While a composite bale stack having an alternating pattern of bale orientations is described above, the loading assembly may also be controlled to form a composite bale stack of bales arranged in the same orientation or a composite bale stack having any suitable pattern of bale orientations. Accordingly, the loading assembly provides the flexibility to establish a variety of composite bale stacks.

Figure 4:
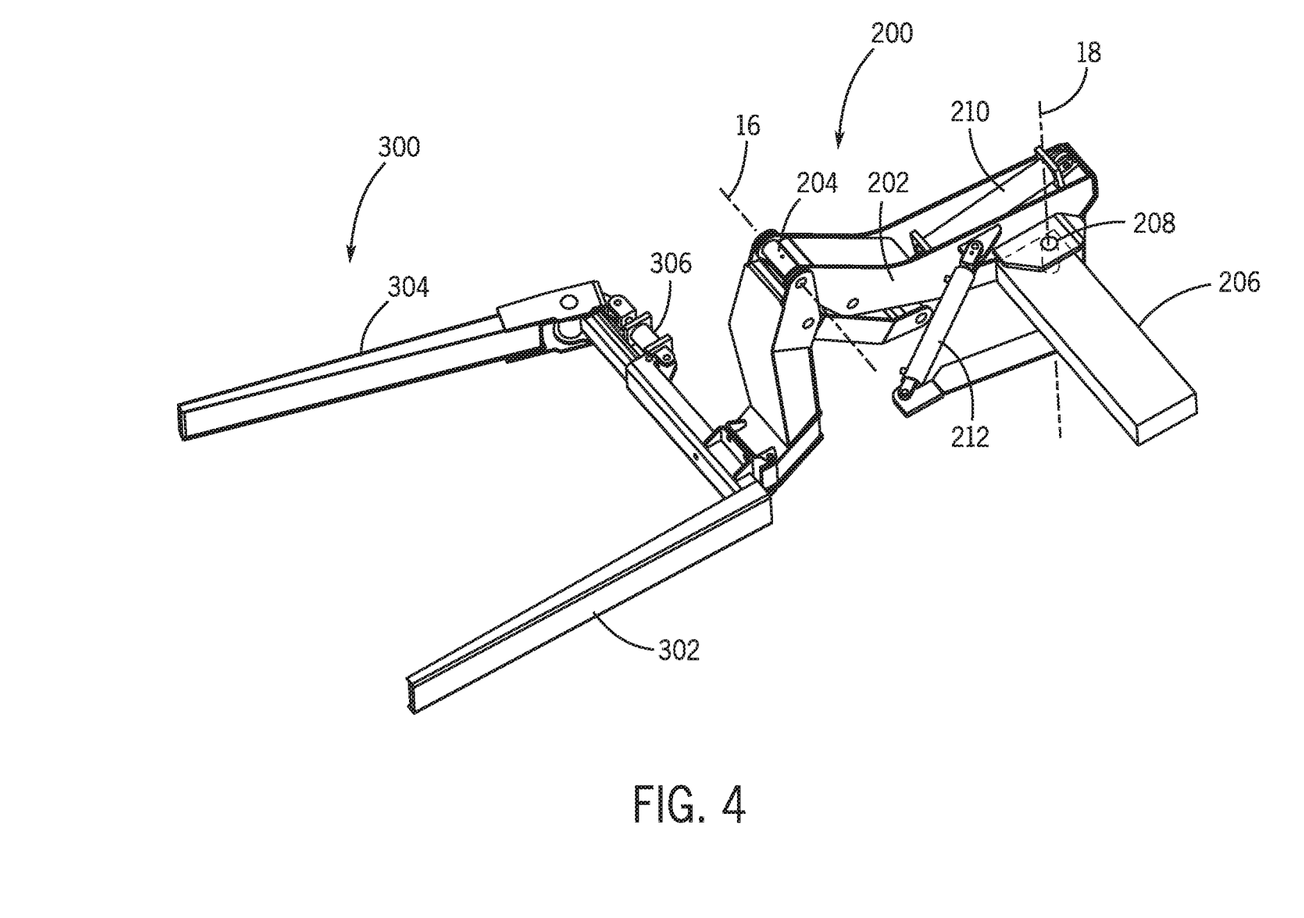
FIG. 4 is a perspective view of an embodiment of a loading assembly that may be employed within the bale wagon of FIG. 1.

FIG. 4 is a perspective view of an embodiment of a loading assembly 200 that may be employed within the bale wagon of FIG. 1. As previously discussed, the loading assembly 200 includes a clamp assembly 300 configured to selectively capture a bale. In addition, the loading assembly 200 includes a lift frame 202 and a first pivot joint 204 pivotally coupling the clamp assembly 300 to the lift frame 202. The first pivot joint 204 is configured to enable the clamp assembly 300 to rotate about the local lateral axis 16 relative to the lift frame 202. The loading assembly 200 also includes a main frame 206 configured to be rigidly coupled to the chassis of the bale wagon. For example, the main frame may be coupled to the bale wagon chassis by fastener(s), a welded connection, an adhesive connection, another suitable type of connection, or a combination thereof. Furthermore, the loading assembly 200 includes a second pivot joint 208 coupling the lift frame 202 to the main frame 206. The second pivot joint 208 is configured to enable the lift frame 202 to rotate about the vertical axis 18 relative to the main frame 206.

The loading assembly 200 also includes a lift actuator 210 coupled to the lift frame 202 and to the clamp assembly 300. The lift actuator 210 is configured to drive the clamp assembly 300 to rotate about the local lateral axis 16 relative to the lift frame 202. Furthermore, the loading assembly 200 includes a rotation actuator 212 coupled to the main frame 206 (e.g., via a bracket) and to the lift frame 202 (e.g., via a mount). The rotation actuator 212 is configured to drive the lift frame 202 to rotate about the vertical axis 18 relative to the main frame 206. As previously discussed, a controller may be communicatively coupled to the lift actuator and to the rotation actuator. The controller may be configured to selectively control the lift actuator to rotate the clamp assembly about the local lateral axis between the illustrated collection position and the longitudinal delivery position, and control the lift actuator and the rotation actuator to rotate the clamp assembly about the local lateral axis and about the vertical axis between the illustrated collection position and the lateral delivery position. In the illustrated embodiment, the lift actuator 210 includes a hydraulic cylinder, and the rotation actuator 212 includes a hydraulic cylinder. However, in other embodiments, the lift actuator and/or the rotation actuator may include another suitable type of actuation element (e.g., a pneumatic cylinder, a linear actuator, a rotary actuator, etc.) and/or multiple actuation elements (e.g., of the same type or of different types).

In the illustrated embodiment, the clamp assembly 300 includes a first arm 302, a second arm 304, and a clamp actuator 306. The clamp actuator 306 is configured to drive the first arm 302 and the second arm 304 toward one another to capture the bale (e.g., between the first and second arms). In the illustrated embodiment, the clamp actuator 306 is configured to drive the second arm 304 to rotate relative to the first arm 302, thereby driving the arms toward one another to capture the bale. However, in alternative embodiments, the clamp actuator may be configured to translate the second arm toward the first arm to capture the bale (e.g., in embodiments in which the first and second arms are slidably coupled to one another by a sliding mechanism). In the illustrated embodiment, the clamp actuator includes a hydraulic cylinder. However, in other embodiments, the clamp actuator may include another suitable type of actuation element (e.g., a pneumatic cylinder, a linear actuator, a rotary actuator, etc.) and/or multiple actuation elements (e.g., of the same type or of different types). Furthermore, while the illustrated loading assembly 200 includes the lift frame 202, the first pivot joint 204, the main frame 206, and the second pivot joint 208, in other embodiments, the loading assembly may have another suitable structure configured to facilitate rotation of the clamp assembly about the local lateral axis and about the vertical axis between the collection position and the lateral delivery position, and in certain embodiments, about the local lateral axis between the collection position and the longitudinal delivery position.

Figure 5:
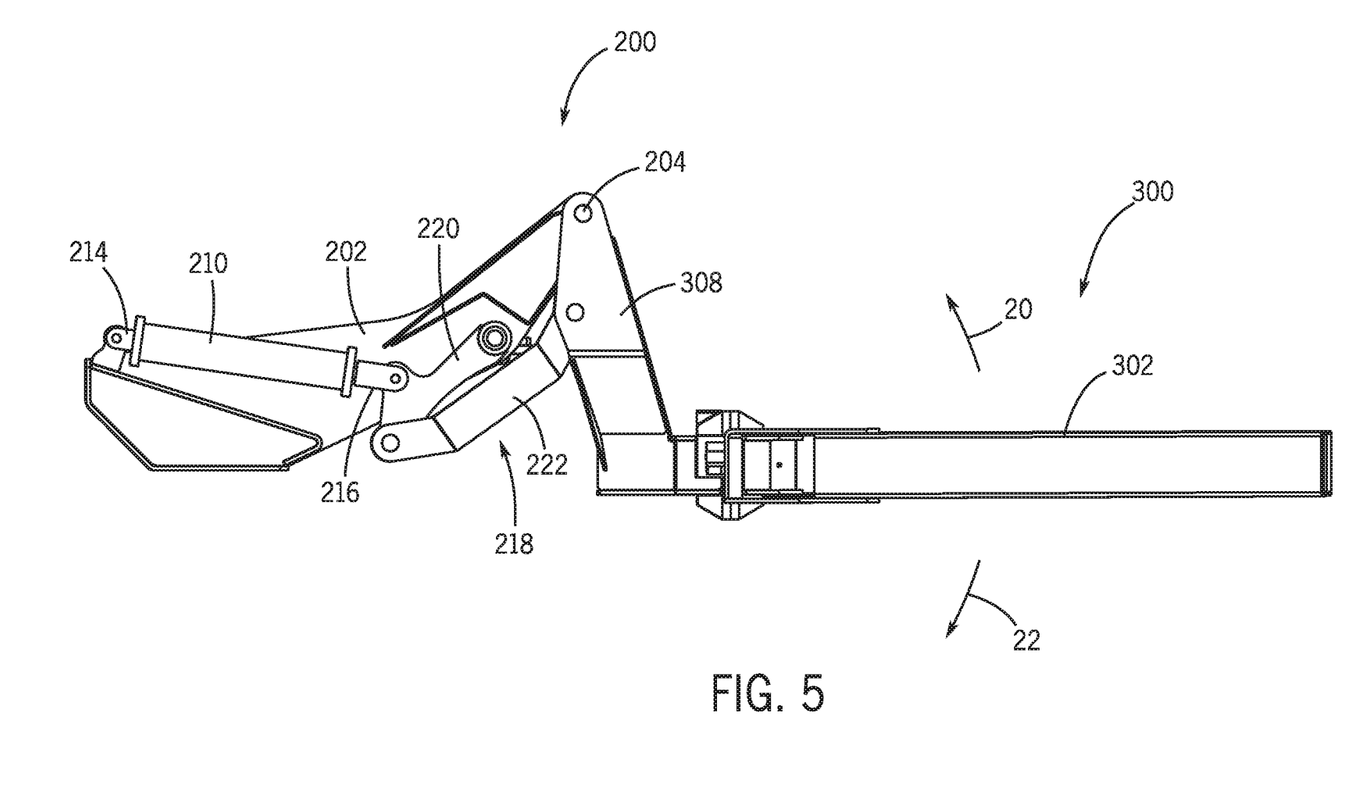
FIG. 5 is a side view of a portion of the loading assembly of FIG. 4.

FIG. 5 is a side view of a portion of the loading assembly 200 of FIG. 4. As previously discussed, the lift actuator 210 is coupled to the lift frame 202 and to the clamp assembly 300, and the lift actuator 210 is configured to drive the clamp assembly 300 to rotate about the local lateral axis relative to the lift frame 202. In the illustrated embodiment, a first end 214 of the lift actuator 210 is coupled to the lift frame 202 (e.g., via a bracket), and a second end 216 of the lift actuator 210 is coupled to a frame 308 of the clamp assembly 300 via a linkage assembly 218. As illustrated, the lift frame 202 is pivotally coupled to the frame 308 of the clamp assembly 300 by the first pivot joint 204, and the frame 308 is coupled to the first arm 302 of the clamp assembly 300. In the illustrated embodiment, the linkage assembly 218 includes a first link 220 and a second link 222. The first link 220 is pivotally coupled to the lift frame 202 and to the second end 216 of the lift actuator 210, and the second link 222 is pivotally coupled to the first link 220 and to the frame 308 of the clamp assembly 300. Extension of the lift actuator 210 causes the linkage assembly 218 to drive the clamp assembly 300 to rotate in an upward direction 20 about the local lateral axis, and retraction of the lift actuator 210 causes the linkage assembly 218 to drive the clamp assembly 300 to rotate in a downward direction 22 about the local lateral axis. While the linkage assembly 218 includes two links in the illustrated embodiment, in other embodiments, the linkage assembly may include more or fewer links (e.g., arranged in any suitable configuration). Furthermore, in certain embodiments, the linkage assembly may be omitted, and the lift actuator may be directly coupled to the clamp assembly.

Figure 6:
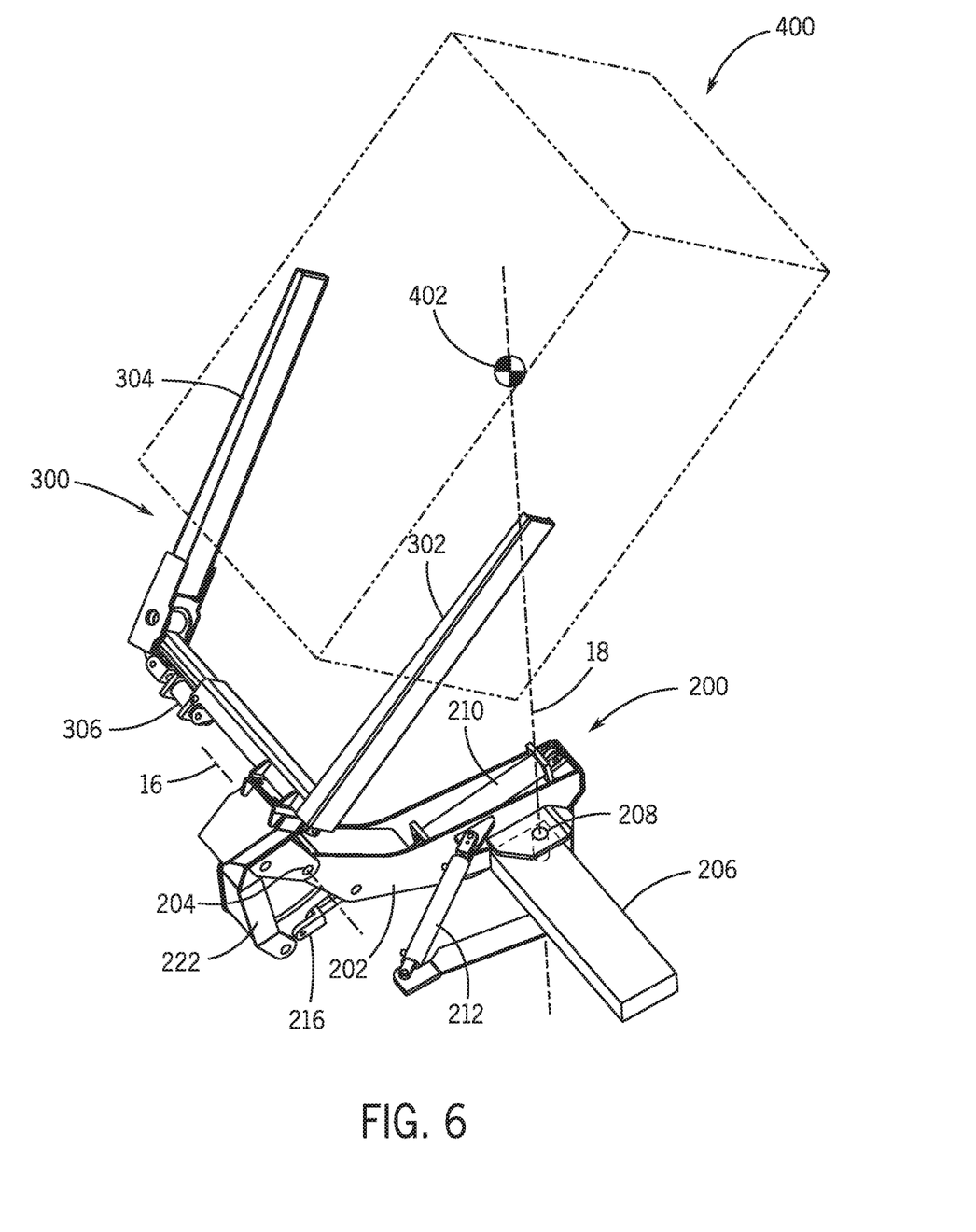
FIG. 6 is a perspective view of the loading assembly of FIG. 4, in which the clamp assembly is in a transition position.

FIG. 6 is a perspective view of the loading assembly 200 of FIG. 4, in which the clamp assembly 300 is in a transition position. As previously discussed, the controller may be configured to control the lift actuator 210 and the rotation actuator 212 to reduce a center of gravity (CG) shift during movement of the clamp assembly 300/bale 400 from the collection position to the lateral delivery position. In certain embodiments, the controller is configured to control the lift actuator 210 and the rotation actuator 212 to rotate the clamp assembly 300 between the collection position and the lateral delivery position via a two-part process. The two-part process includes controlling the lift actuator 210 to rotate the clamp assembly 300 about 180 degrees about the local lateral axis 16, and controlling the rotation actuator 212 to rotate the clamp assembly 300 about 90 degrees about the vertical axis 18 in response to receiving a signal indicative of a CG 402 of the bale 400 being substantially positioned along the vertical axis 18 (e.g., within a threshold distance of the vertical axis 18). In certain embodiments, the controller may be configured to control the lift actuator 210 to terminate rotation of the clamp assembly 300 about the local lateral axis 16 in response to receiving the signal indicative of the CG 402 of the bale 400 being substantially positioned along the vertical axis 18, and the controller may be configured to control the lift actuator 210 to resume rotation of the clamp assembly 300 about the local lateral axis 16 in response to the clamp assembly 300 being rotated about 90 degrees about the vertical axis 18. However, in other embodiments, the controller may be configured to control the lift actuator 210 to rotate the clamp assembly 300 continuously about the local lateral axis 16 (e.g., before rotation about the vertical axis 18, during rotation about the vertical axis 18, and after rotation about the vertical axis 18, if the rotation about the local lateral axis 16 is not complete). Furthermore, in certain embodiments, the controller may be configured to control the lift actuator to reduce the rotation rate of the clamp assembly about the local lateral axis in response to receiving the signal indicative of the CG of the bale being substantially positioned along the vertical axis.

Because the clamp assembly is not rotated about the vertical axis until the CG of the bale is substantially positioned along the vertical axis, the CG of the bale wagon may be substantially maintained in a desired location as the loading assembly moves the clamp assembly from the collection position to the lateral delivery position (e.g., as compared to a loading assembly that rotates the clamp assembly about a single axis that is angled relative to the longitudinal axis of the bale wagon and causes the CG of the bale wagon to shift outside of a desired location during rotation of the clamp assembly about the single axis between the collection position and the lateral delivery position). Accordingly, traction between the wheels of the bale wagon and the ground may be substantially maintained.

In certain embodiments, the controller is configured to control the lift actuator 210 and the rotation actuator 212 to rotate the clamp assembly 300 between the lateral delivery position and the collection position via a two-part process (e.g., after the bale is delivered to the table). The two-part process includes controlling the lift actuator 210 to rotate the clamp assembly 300 about 180 degrees about the local lateral axis 16, and controlling the rotation actuator 212 to rotate the clamp assembly 300 about 90 degrees about the vertical axis 18 in response to receiving a signal indicative of a CG of the clamp assembly 300 being substantially positioned along the vertical axis 18 (e.g., within a threshold distance of the vertical axis 18). In certain embodiments, the controller may be configured to control the lift actuator 210 to terminate rotation of the clamp assembly 300 about the local lateral axis 16 in response to receiving the signal indicative of the CG of the clamp assembly being substantially positioned along the vertical axis 18, and the controller may be configured to control the lift actuator 210 to resume rotation of the clamp assembly 300 about the local lateral axis 16 in response to the clamp assembly 300 being rotated about 90 degrees about the vertical axis 18. However, in other embodiments, the controller may be configured to control the lift actuator 210 to rotate the clamp assembly 300 continuously about the local lateral axis 16 (e.g., before rotation about the vertical axis 18, during rotation about the vertical axis 18, and after rotation about the vertical axis 18, if the rotation about the local lateral axis 16 is not complete). Furthermore, in certain embodiments, the controller may be configured to control the lift actuator to reduce the rotation rate of the clamp assembly about the local lateral axis in response to receiving the signal indicative of the CG of the bale being substantially positioned along the vertical axis.

Figure 7:
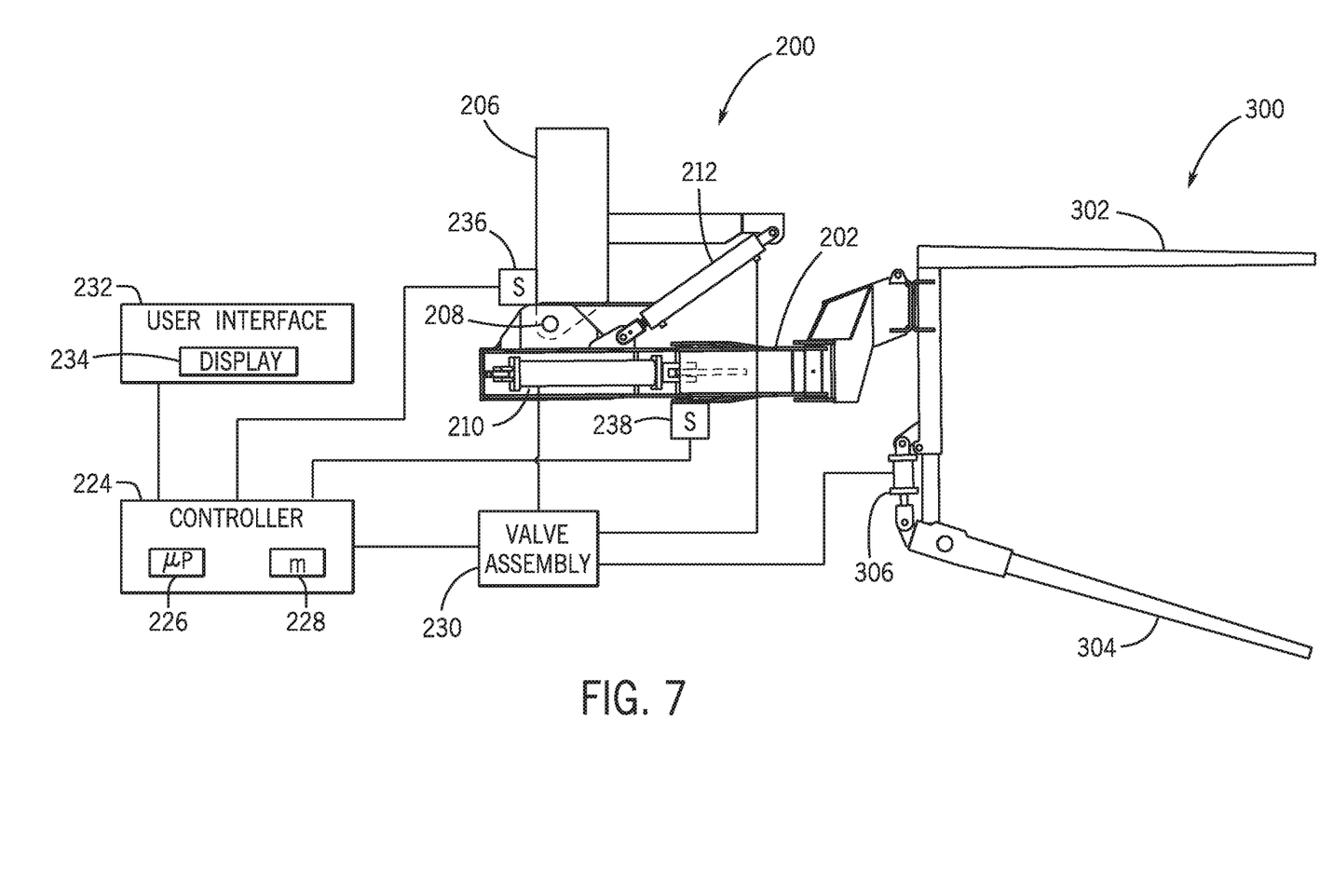
FIG. 7 is a schematic diagram of an embodiment of a loading assembly that may be employed within the bale wagon of FIG. 1.

FIG. 7 is a schematic diagram of an embodiment of a loading assembly 200 that may be employed within the bale wagon of FIG. 1. In the illustrated embodiment, the loading assembly 200 includes a controller 224 communicatively coupled to the lift actuator 210, the rotation actuator 212, and the clamp actuator 306. The controller 224 is configured to control the actuators, thereby controlling movement of the clamp assembly 300 and actuation of the clamp arms. In certain embodiments, the controller 224 is an electronic controller having electrical circuitry configured to control the actuators. In the illustrated embodiment, the controller 224 includes a processor, such as the illustrated microprocessor 226, and a memory device 228. The controller 224 may also include one or more storage devices and/or other suitable components. The processor 226 may be used to execute software, such as software for controlling the actuators, and so forth. Moreover, the processor 226 may include multiple microprocessors, one or more "general-purpose" microprocessors, one or more special-purpose microprocessors, and/or one or more application specific integrated circuits (ASICS), or some combination thereof. For example, the processor 226 may include one or more reduced instruction set (RISC) processors.

The memory device 228 may include a volatile memory, such as random access memory (RAM), and/or a nonvolatile memory, such as read-only memory (ROM). The memory device 228 may store a variety of information and may be used for various purposes. For example, the memory device 228 may store processor-executable instructions (e.g., firmware or software) for the processor 226 to execute, such as instructions for controlling the actuators, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., a configuration of the bale wagon, a configuration of the loading assembly, etc.), instructions (e.g., software or firmware for controlling the actuators, etc.), and any other suitable data.

In the illustrated embodiment, the controller 224 is communicatively coupled to the actuators via a valve assembly 230. The valve assembly 230 may include one or move valves configured to control flow of fluid (e.g., hydraulic fluid, air, etc.) to the actuators based on signal(s) from the controller 224. For example, controller 224 may output signal(s) to a lift control valve of the valve assembly 230, which is fluidly coupled to the lift actuator 210, to control the lift actuator 210. In addition, the controller 224 may output signal(s) to a rotation control valve of the valve assembly 230, which is fluidly coupled to the rotation actuator 212, to control the rotation actuator 212. The controller 224 may also output signal(s) to a clamp control valve of the valve assembly 230, which is fluidly coupled to the clamp actuator 306, to control the clamp actuator 306. However, in other embodiments, the valve assembly may have any other suitable valves configured to control fluid flow to the actuators in response to signal(s) from the controller. Furthermore, in certain embodiments, at least one actuator may be an electronically controlled actuator, such as a linear actuator or an electric motor. In such embodiments, the electrically controlled actuator may be communicatively coupled directly to the controller 224.

In the illustrated embodiment, the loading assembly 200 includes a user interface 232 communicatively coupled to the controller 224. The user interface includes a display 234 configured to present information to an operator of the bale wagon (e.g., the position of the clamp assembly, the location of the bale wagon within the field, etc.). In certain embodiments, the display 234 may include a touch screen interface configured to receive input from the operator. For example, the touch screen display may enable an operator to control the position of the clamp assembly via interaction with the display. Furthermore, in certain embodiments, the user interface may include other and/or additional controls (e.g., button(s), knob(s), a mouse, a keyboard, etc.) configured to enable the operator to control the loading assembly and/or other operations of the bale wagon.

In certain embodiments, the controller 224 is configured to selectively control the lift actuator 210 to rotate the clamp assembly 300 about the local lateral axis between the collection position and the longitudinal delivery position, and control the lift actuator 210 and the rotation actuator 212 to rotate the clamp assembly 300 about the local lateral axis and about the vertical axis between the collection position and the lateral delivery position. Furthermore, the controller 224 is configured to control the clamp actuator 306 to selectively drive the arms of the clamp assembly 300 toward one another to capture a bale. For example, while the clamp assembly is in the collection position and a bale is positioned between the arms, the controller may control the clamp actuator to drive the arms toward one another to capture the bale. The controller may then control the lift actuator to rotate the clamp assembly about 180 degrees about the local lateral axis between the collection position and the longitudinal delivery position, or the controller may control the lift actuator to rotate the clamp assembly about 180 degrees about the local lateral axis and control the rotation actuator to rotate the clamp assembly about 90 degrees about the vertical axis between the collection position and the lateral delivery position. As a result, the bale may be positioned on the table (e.g., the first table) in a target orientation. The controller may then control the clamp actuator to drive the arms away from one another, thereby releasing in the bale.

In certain embodiments, the controller 224 is configured to control the lift actuator 210 and the rotation actuator 212 to reduce a center of gravity (CG) shift during movement of the clamp assembly 300/bale from the collection position to the lateral delivery position. In such embodiments, the controller 224 is configured to control the lift actuator 210 and the rotation actuator 212 to rotate the clamp assembly 300 between the collection position and the lateral delivery position via a two-part process. The two-part process includes controlling the lift actuator 210 to rotate the clamp assembly 300 about 180 degrees about the local lateral axis, and controlling the rotation actuator 212 to rotate the clamp assembly 300 about 90 degrees about the vertical axis in response to receiving a signal indicative of the CG of the bale being substantially positioned along the vertical axis. In certain embodiments, the controller 224 is configured to control the lift actuator 210 to terminate rotation of the clamp assembly 300 about the local lateral axis in response to receiving the signal indicative of the CG of the bale being substantially positioned along the vertical axis, and the controller is configured to control the lift actuator 210 to resume rotation of the clamp assembly 300 about the local lateral axis in response to the clamp assembly 300 being rotated about 90 degrees about the vertical axis. However, in other embodiments, the controller may be configured to control the lift actuator 210 to rotate the clamp assembly 300 continuously about the local lateral axis (e.g., before rotation about the vertical axis, during rotation about the vertical axis, and after rotation about the vertical axis, if the rotation about the local lateral axis is not complete). Furthermore, in certain embodiments, the controller may be configured to control the lift actuator to reduce the rotation rate of the clamp assembly about the local lateral axis in response to receiving the signal indicative of the CG of the bale being substantially positioned along the vertical axis.

In certain embodiments, the loading assembly 200 includes one or more sensors communicatively coupled to the controller 224 and configured to output the signal indicative of the CG of the bale being substantially positioned along the vertical axis. In the illustrated embodiment, the loading assembly 200 includes a torque sensor 236 and a clamp assembly position sensor 238. As illustrated, each sensor is communicatively coupled to the controller 224. The torque sensor 236 may be coupled to the main frame 206 and/or to the lift frame 202, and the torque sensor 236 may output a signal indicative of the torque applied to the main frame 206 by the lift frame 202 (e.g., about the fixed lateral axis of the bale wagon). The controller 224 may determine that the CG of the bale is substantially positioned along the vertical axis in response to the torque reaching a minimum threshold value and/or the torque reaching a minimum value (e.g., a local minimum value). The torque sensor 236 may include any suitable device configured to output a signal indicative of torque applied to the main frame by the lift frame.

Furthermore, the clamp assembly position sensor 238 may be coupled to the lift frame 202 and/or the clamp assembly 300, and the clamp assembly position sensor 238 may output a signal indicative of the position of the clamp assembly 300. The controller 224 may determine that the CG of the bale is substantially positioned along the vertical axis in response to the clamp assembly reaching the transition position, as shown in FIG. 6. The clamp assembly position sensor 238 may include any suitable device configured to output a signal indicative of the position of the clamp assembly (e.g., a potentiometer, an infrared sensor, an ultrasonic sensor, etc.). While the illustrated embodiment includes the torque sensor 236 and the clamp assembly position sensor 238, in other embodiments, the loading assembly may include a single sensor (e.g., the torque sensor or the clamp assembly position sensor), or the loading assembly may include other and/or additional sensor(s) (e.g., stain gauge(s), optical sensor(s), etc.) configured to facilitate determination of substantial alignment of the CG of the bale with the vertical axis.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A loading assembly of a bale wagon, comprising:
   a clamp assembly;
   a lift actuator configured to drive the clamp assembly to rotate about a local lateral axis;
   a rotation actuator configured to drive the clamp assembly to rotate about a vertical axis; and
   a controller communicatively coupled to the lift actuator and to the rotation actuator, wherein the controller comprises a memory and a processor, and the controller is configured to selectively:
      control the lift actuator to rotate the clamp assembly about 180 degrees about the local lateral axis between a collection position and a longitudinal delivery position; and
      control the lift actuator and the rotation actuator to rotate the clamp assembly about the local lateral axis and about the vertical axis between the collection position and a lateral delivery position.

2. The loading assembly of claim 1, wherein the lift actuator comprises a hydraulic cylinder, the rotation actuator comprises a hydraulic cylinder, or a combination thereof.

3. The loading assembly of claim 1, wherein the clamp assembly is configured to position a bale on a table of the bale wagon, such that a longitudinal axis of the bale is substantially parallel to a longitudinal axis of the bale wagon, while the clamp assembly is in the longitudinal delivery position.

4. The loading assembly of claim 1, wherein the clamp assembly is configured to position a bale on a table of the bale wagon, such that a longitudinal axis of the bale is substantially parallel to a fixed lateral axis of the bale wagon, while the clamp assembly is in the lateral delivery position.

5. The loading assembly of claim 1, wherein the controller is configured to control the rotation actuator to rotate the clamp assembly about 90 degrees about the vertical axis between the collection position and the lateral delivery position.

6. The loading assembly of claim 5, wherein the controller is configured to control the rotation actuator to rotate the clamp assembly about 90 degrees about the vertical axis in response to receiving a signal indicative of a center of gravity of a bale captured by the clamp assembly being substantially positioned along the vertical axis.

7. The loading assembly of claim 6, further comprising a sensor communicatively coupled to the controller and configured to output the signal indicative of the center of gravity of the bale being substantially positioned along the vertical axis.

8. A loading assembly of a bale wagon, comprising:
   a clamp assembly configured to selectively capture a bale;
   a lift frame;
   a first pivot joint pivotally coupling the clamp assembly to the lift frame, wherein the first pivot joint is configured to enable the clamp assembly to rotate about a local lateral axis relative to the lift frame;
   a main frame configured to rigidly couple to a chassis of the bale wagon;
   a second pivot joint pivotally coupling the lift frame to the main frame, wherein the second pivot joint is configured to enable the lift frame to rotate about a vertical axis relative to the main frame;
   a lift actuator coupled to the lift frame and to the clamp assembly, wherein the lift actuator is configured to drive the clamp assembly to rotate about the local lateral axis relative to the lift frame;
   a rotation actuator coupled to the main frame and to the lift frame, wherein the rotation actuator is configured to drive the lift frame to rotate about the vertical axis relative to the main frame; and
   a controller communicatively coupled to the lift actuator and to the rotation actuator, wherein the controller comprises a memory and a processor, and the controller is configured to selectively:
      control the lift actuator to rotate the clamp assembly about 180 degrees about the local lateral axis between a collection position and a longitudinal delivery position; and
      control the lift actuator and the rotation actuator to rotate the clamp assembly about the local lateral axis and about the vertical axis between the collection position and a lateral delivery position.

9. The loading assembly of claim 8, wherein the lift actuator comprises a hydraulic cylinder, the rotation actuator comprises a hydraulic cylinder, or a combination thereof.

10. The loading assembly of claim 8, wherein the clamp assembly comprises a first arm, a second arm, and a clamp actuator, and the clamp actuator is configured to drive the first arm and the second arm toward one another to capture the bale.

11. The loading assembly of claim 8, wherein the clamp assembly is configured to position the bale on a table of the bale wagon, such that a longitudinal axis of the bale is substantially parallel to a longitudinal axis of the bale wagon, while the clamp assembly is in the longitudinal delivery position.

12. The loading assembly of claim 8, wherein the clamp assembly is configured to position the bale on a table of the bale wagon, such that a longitudinal axis of the bale is substantially parallel to a fixed lateral axis of the bale wagon, while the clamp assembly is in the lateral delivery position.

13. The loading assembly of claim 8, wherein the controller is configured to control the rotation actuator to rotate the clamp assembly about 90 degrees about the vertical axis between the collection position and the lateral delivery position.

14. A loading assembly of a bale wagon, comprising:
a lift actuator configured to drive a clamp assembly to rotate about a local lateral axis;
a rotation actuator configured to drive the clamp assembly to rotate about a vertical axis; and
a controller communicatively coupled to the lift actuator and to the rotation actuator, wherein the controller comprises a memory and a processor, and the controller is configured to control the lift actuator and the rotation actuator to rotate the clamp assembly between a collection position and a lateral delivery position by:
controlling the lift actuator to rotate the clamp assembly about 180 degrees about the local lateral axis; and
controlling the rotation actuator to rotate the clamp assembly about 90 degrees about the vertical axis in response to receiving a signal indicative of a center of gravity of a bale captured by the clamp assembly being substantially positioned along the vertical axis.

15. The loading assembly of claim 14, wherein the controller is configured to control the lift actuator to terminate rotation of the clamp assembly in response to receiving the signal indicative of the center of gravity of the bale being substantially positioned along the vertical axis, and the controller is configured to control the lift actuator to resume rotation of the clamp assembly in response to the clamp assembly being rotated about 90 degrees about the vertical axis.

16. The loading assembly of claim 14, wherein the clamp assembly is configured to position the bale on a table of the bale wagon, such that a longitudinal axis of the bale is substantially parallel to a fixed lateral axis of the bale wagon, while the clamp assembly is in the lateral delivery position.

17. The loading assembly of claim 14, further comprising a sensor communicatively coupled to the controller and configured to output the signal indicative of the center of gravity of the bale being substantially positioned along the vertical axis.

18. The loading assembly of claim 17, wherein the sensor comprises a torque sensor, a clamp assembly position sensor, or a combination thereof.

* * * * *